(12) United States Patent
Wang et al.

(10) Patent No.: US 10,691,755 B2
(45) Date of Patent: *Jun. 23, 2020

(54) ORGANIZING SEARCH RESULTS BASED UPON CLUSTERED CONTENT

(71) Applicant: Microsoft Technology Licensing, LLC, Redmond, WA (US)

(72) Inventors: Xin-Jing Wang, Beijing (CN); Lei Zhang, Beijing (CN); Wei-Ying Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/613,697

(22) Filed: Jun. 5, 2017

(65) Prior Publication Data

US 2017/0270222 A1 Sep. 21, 2017

Related U.S. Application Data

(63) Continuation of application No. 12/813,909, filed on Jun. 11, 2010, now Pat. No. 9,703,895.

(51) Int. Cl.
*G06F 16/00* (2019.01)
*G06F 16/9038* (2019.01)
(Continued)

(52) U.S. Cl.
CPC .......... *G06F 16/9038* (2019.01); *G06F 16/51* (2019.01); *G06F 16/583* (2019.01)

(58) Field of Classification Search
CPC ......... G06F 17/30991; G06F 17/30247; G06F 17/3028; G06F 16/9038; G06F 16/583; G06F 16/51
See application file for complete search history.

(56) References Cited

U.S. PATENT DOCUMENTS 6,567,797 B1 5/2003 Schuetze et al.
7,305,389 B2 12/2007 Zeng et al.
(Continued)

OTHER PUBLICATIONS

Velivelli et al., "Automatic Video Annotation Using Multimodal Dirichlet Process Mixture Model," Apr. 6-8, 2008, Proceeding of the IEEE International Conference on Networking, Sensing and Control, pp. 1366-1377.

(Continued)

*Primary Examiner* — Leslie Wong
(74) *Attorney, Agent, or Firm* — Rainier Patents, P.S.

(57) ABSTRACT

Many users make use of search engines to locate desired internet content by submitting search queries. For example, a user may search for photos, applications, websites, videos, documents, and/or information regarding people, places, and things. Unfortunately, search engines may provide a plethora of information that a user may be left to sift through to find relevant content. Accordingly, one or more systems and/or techniques for organizing search results are disclosed herein. In particular, user generated content, such as photos, may be retrieved based upon a search query. The user generated content may be grouped into clusters of user generated content having similar features. Search results of the search query may be obtained and organized based upon comparing the search results with the clusters. The organized search results and/or a table of content including the clusters may be presented to provide an enhanced user experience.

19 Claims, 10 Drawing Sheets

(51) Int. Cl.
   *G06F 16/51*     (2019.01)
   *G06F 16/583*    (2019.01)

(56) References Cited

U.S. PATENT DOCUMENTS

| | | | |
|---|---|---|---|
| 7,536,384 B2 | 5/2009 | Venkataraman et al. | |
| 7,571,162 B2 | 8/2009 | Sun et al. | |
| 7,711,747 B2 | 5/2010 | Renders et al. | |
| 7,962,915 B2 | 6/2011 | Eshel et al. | |
| 8,037,071 B2 | 10/2011 | Venkataraman et al. | |
| 8,090,222 B1* | 1/2012 | Baluja | G06F 16/5838 382/305 |
| 8,200,010 B1 | 6/2012 | Jing et al. | |
| 8,352,465 B1* | 1/2013 | Jing | G06F 16/54 707/723 |
| 8,489,627 B1* | 7/2013 | Brandt | G06F 17/30277 707/765 |
| 8,554,873 B1* | 10/2013 | Ganesh | G06Q 30/0261 709/206 |
| 8,631,004 B2* | 1/2014 | Mishne | G06F 16/951 707/727 |
| 9,092,458 B1* | 7/2015 | Perona | G06F 16/583 |
| 9,703,895 B2* | 7/2017 | Wang | G06F 17/30247 |
| 2003/0093790 A1* | 5/2003 | Logan | G06F 17/30265 725/38 |
| 2004/0098175 A1 | 5/2004 | Said et al. | |
| 2005/0144158 A1 | 6/2005 | Capper et al. | |
| 2005/0165744 A1 | 7/2005 | Taylor et al. | |
| 2007/0174269 A1* | 7/2007 | Jing | G06F 17/30265 |
| 2007/0239764 A1* | 10/2007 | Song | G06F 17/30265 725/38 |
| 2007/0250486 A1 | 10/2007 | Liao et al. | |
| 2008/0133479 A1 | 6/2008 | Zelevinsky et al. | |
| 2008/0168054 A1 | 7/2008 | Lee et al. | |
| 2008/0244429 A1 | 10/2008 | Stading | |
| 2008/0268876 A1 | 10/2008 | Gelfand et al. | |
| 2009/0094207 A1 | 4/2009 | Marvit et al. | |
| 2009/0094210 A1 | 4/2009 | Reinhardt et al. | |
| 2009/0125372 A1 | 5/2009 | van Zwol et al. | |
| 2009/0125510 A1 | 5/2009 | Graham et al. | |
| 2009/0148068 A1* | 6/2009 | Woodbeck | G06F 17/30256 382/305 |
| 2009/0199115 A1 | 8/2009 | Singh | |
| 2009/0271433 A1 | 10/2009 | Perronnin et al. | |
| 2009/0281870 A1* | 11/2009 | Sun | G06Q 10/10 705/7.29 |
| 2009/0290812 A1* | 11/2009 | Naaman | G06K 9/4671 382/305 |
| 2010/0046842 A1* | 2/2010 | Conwell | G06F 17/30265 382/218 |
| 2010/0088647 A1* | 4/2010 | Jing | G06F 17/30265 715/838 |
| 2010/0306249 A1* | 12/2010 | Hill | G06F 17/30867 707/769 |
| 2011/0029510 A1 | 2/2011 | Kroon et al. | |
| 2011/0184932 A1 | 7/2011 | Hennum et al. | |
| 2011/0184949 A1* | 7/2011 | Luo | G06F 16/58 707/737 |
| 2011/0184953 A1* | 7/2011 | Joshi | H04N 1/00183 707/738 |
| 2011/0211736 A1* | 9/2011 | Krupka | G06F 17/30259 382/118 |
| 2013/0138685 A1* | 5/2013 | Brucher | G06F 17/30241 707/769 |
| 2013/0282712 A1* | 10/2013 | Brandt | G06F 17/30277 707/731 |
| 2015/0304437 A1* | 10/2015 | Vaccari | G06F 1/3215 709/204 |
| 2016/0179843 A1* | 6/2016 | Heldt | G06F 17/30241 707/724 |
| 2017/0270222 A1* | 9/2017 | Wang | G06F 16/9038 |

OTHER PUBLICATIONS

Nie et al., "A Tourist Route Planning and Navigation System Based on LBS," Proceedings of the 2009 International Symposium on Web Information Systems and Applications (WISA'09), May 22-24, 2009, pp. 288-290.

Elango et al., "Clustering Images Using the Latent Dirichlet Allocation Model," retrieved at <<http://pages.cs.wisc.edu/-pradheep/Clust-LDA.pdf>>, University of Wisconsin, Dec. 2005, pp. 1-18.

Masada et al., "Clustering Images with Multinomial Mixture Models," Proceedings of the 8th International Symposium on Advanced Intelligent System (ISIS), Sep. 2007, p. 6.

Lee et al., "Multi-Media Map for Visual Navigation," retrieved at <<http://www.lsgi.polyu.edu.hk/sTAFF/zl.li/vol_3_2/02_lee.pdf>>, Journal of Geospatial Engineering, vol. 3, No. 2, Dec. 2001, pp. 87-96.

Schmidt-Belz et al., "Location-based Mobile Tourist Services—First User Experiences," retrieved at <<http://citeseerx.ist.psu.edu/viewdoc/download?doi=10.1.1.11.5956&rep1&type=pdf>>, 10th International Conference on Information and Communication Technologies in Tourism, 2003, p. 10.

Chevallet et al., "Object Indentification and Retrieval from Efficient Image Matching: Snap2Tell with the STOIC Dataset," Information Processing and Management: an International Journal, Special Issue: AIRS2005: Information retrieval Research in Asia, vol. 43, No. 2, Mar. 2007, pp. 97-112.

Ambai et al., "Multiclass VisualRank: Image Ranking Method in Clustered Subsets Based on Visual Features," Proceeding of the 32nd International ACM SIGIR Conference on Research and Development in Information Retrieval, Jul. 19-23, 2009, pp. 732-733.

Barnard et al., "Clustering Art," Proceedings of the 2001 IEEE Computer Society Conference on Computer Vision and Pattern Recognition, Dec. 8-14, 2001, p. 8.

Cai et al., "Hierarchical Clustering of WWW Image Search Results Using Visual, Textual and Link Information," Proceedings of the 12th Annual ACM International Conference on Multimedia Oct. 10, 2004, pp. 952-959.

Crandall et al., "Mapping the World's Photos," Proceedings of the 18th International Conference on World Wide Web, Apr. 20, 2009, pp. 761-770, 10 pages.

Cui et al., "Intentsearch: Interactive On-line Image Search Re-ranking," Proceedings of the 16th ACM international conference on Multimedia, Oct. 26-31, 2008, pp. 997-998, 2 pages.

Blei et al., "Modeling Annotated Data," Proceedings of the 26th annual international ACM SIGIR conference on Research and development in information retrieval, pp. 127-134, Jul. 28-Aug. 1, 2003, 8 pages.

Dhillon, Inderjit S., "Co-clustering documents and words using bipartite spectral graph partitioning," Proceedings of the seventh ACM SIGKDD international conference on Knowledge discovery and data mining, pp. 269-274, Aug. 26-29, 2001, 6 pages.

Ferguson, Thomas S., "A Bayesian analysis of some nonparametric problems," The annals of statistics, 1973, vol. 1, No. 2, pp. 209-230, 23 pages.

Gao et al., "Web image clustering by consistent utilization of visual features and surrounding texts," Proceedings of the 13th annual ACM international conference on Multimedia, pp. 112-121, Nov. 6-11, 2005.

Gao et al., "Consistent bipartite graph co-partitioning for star-structured high-order heterogeneous data co-clustering," Proceedings of the eleventh ACM SIGKDD international conference on Knowledge discovery in data mining, pp. 41-50. ACM, Aug. 21-24, 2005, 10 pages.

Ghahramani et al., "Bayesian sets," Advances in neural information processing systems, pp. 435-442, Dec. 5-8, 2006, 8 pages.

Ishwaran et al., "Gibbs sampling methods for stick-breaking priors," Journal of the American Statistical Association 96, No. 453, Mar. 2001, pp. 161-173.

Jing et al., "Visualrank: Applying pagerank to large-scale image search," IEEE Transactions on Pattern Analysis and Machine Intelligence, Nov. 2008, 30(11), pp. 1877-1890.

Van Leuken et al., "Visual diversification of image search results," Proceedings of the 18th international conference on World wide web, pp. 341-350, Apr. 20-24, 2009.

(56) References Cited

OTHER PUBLICATIONS

Lin et al., "Web image retrieval re-ranking with relevance model," International Conference on Web Intelligence, Proceedings, Oct. 2003, pp. 242-248, 7 pages.
Loeff et al., "Discriminating image senses by clustering with multimodal features," Proceedings of the COLNG/ACL on Main conference poster sessions, pp. 547-554, Association for Computational Linguistics, Jul. 17-18, 2006.
Melia, Marina, "Comparing clusterings: an axiomatic view," Proceedings of the 22nd international conference on Machine learning, Aug. 7-11, 2005, pp. 577-584, 8 pages.
Neal, Radford M., "Markov chain sampling methods for Dirichlet process mixture models," Journal of computational and graphical statistics vol. 9, No. 2, Jun. 2000, pp. 249-265, 18 pages.
Plangprasopchok et al., "Constructing folksonomies from user-specified relations on flickr," Proceedings of the 18th international conference on World wide web, Apr. 20-24, 2009, pp. 781-790.
Rege et al., "Clustering web images with multi-modal features," Proceedings of the 15th ACM international conference on Multimedia, Sep. 25-29, 2007, pp. 317-320, 4 pages.
Van De Sande et al., "Evaluating color descriptors for object and scene recognition," IEEE transactions on pattern analysis and machine intelligence, vol. 32, No. 9, Jul. 2010, pp. 1582-1596, 15 pages.
Sethuraman, Jayaram, "A constructive definition of Dirichlet priors," retrieved at <<http://sta.fsu.edu/techreports/M843.pdf>>, FSU Technical Report No. M-843, USARO Technical Report No. D-118, May 1991, 14 pages.
Yakhnenko et al., "Multi-modal hierarchical Dirichlet process model for predicting image annotation and image-object label correspondence," Proceedings of the 2009 SIAM International Conference on Data Mining, pp. 283-293. Apr. 30-May 2, 2009, 11 pages.
Zitouni et al., "Re-ranking of web image search results using a graph algorithm," 19th International Conference on Pattern Recognition, Dec. 8-11, 2008, pp. 104.
Non-Final Office Action dated Jul. 9, 2012 from U.S. Appl. No. 12/813,909, 14 pages.
Response filed Oct. 9, 2012 to the Non-Final Office Action dated Jul. 9, 2012 from U.S. U.S. Appl. No. 12/813,909, 16 pages.
Final Office Action dated Feb. 27, 2013 from U.S. U.S. Appl. No. 12/813,909, 14 pages.
Response filed May 28, 2013 to the Final Office Action dated Feb. 27, 2013 from U.S. U.S. Appl. No. 12/813,909, 13 pages.
Non-Final Office Action dated Jun. 17, 2014 from U.S. U.S. Appl. No. 12/813,909, 14 pages.
Response filed Sep. 17, 2014 to the Non-Final Office Action dated Jun. 17, 2014 from U.S. U.S. Appl. No. 12/813,909, 14 pages.
Final Office Action dated Oct. 1, 2014 from U.S. U.S. Appl. No. 12/813,909, 15 pages.
Applicant Initiated Interview Summary dated Nov. 4, 2014 from U.S. U.S. Appl. No. 12/813,909, 3 pages.
Response filed Mar. 31, 2015 to the Final Office Action datedOct. 1, 2014 from U.S. U.S. Appl. No. 12/813,909, 14 pages.
Non-Final Office Action dated Jan. 29, 2016 from U.S. U.S. Appl. No. 12/813,909, 15 pages.
Response filed Mar. 29, 2016 to the Non-Final Office Action dated Jan. 29, 2016 from U.S. U.S. Appl. No. 12/813,909, 15 pages.
Final Office Action dated Jul. 29, 2016 from U.S. U.S. Appl. No. 12/813,909, 16 pages.
Response filed Sep. 1, 2016 to the Final Office Action dated Jul. 29, 2016 from U.S. U.S. Appl. No. 12/813,909, 15 pages.
Notice of Allowance dated Mar. 27, 2017 from U.S. U.S. Appl. No. 12/813,909, 20 pages.

\* cited by examiner

ORGANIZING SEARCH RESULTS BASED UPON CLUSTERED CONTENT

BACKGROUND

Many internet users discover and interact with internet content using search queries. For example, a user may search for websites, images, videos, travel information, and other intent content by submitting a query to a search engine. Unfortunately, a search engine may provide results that are redundant, irrelevant, and/or unhelpful. For example, a user may desire to plan a vacation to Greece. The user may search for "Parthenon in Athens" to obtain additional information about vacationing in Greece. Search results may comprise thousands of unorganized results relating to a variety of information. For example, high-quality images of the Parthenon, small or low quality images of the Parthenon, gimmicky souvenirs of the Parthenon, personal blogs about Athens, and/or a plethora of other content relating to the search may be returned. Sifting through the hundreds of thousands of results may prove a daunting task to the user. Thus, the user may miss out on desired content (e.g., vacation activities in Greece, high-quality images of the Parthenon, and/or other relevant content) because the user is not provided with helpful guidance.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for organizing search results are disclosed herein. Search results may be results (e.g., images, a list of web pages, internet content, etc.) returned by a general purpose search engine in response to a search query. User generated content may be retrieved based upon the search query. It may be appreciated that user generated content may be images, blogs, videos, text, web pages, and/or other user content. The user generated content may be retrieved based upon mining websites, databases, and/or other data stores using the search query. In one example, the search query "Parthenon in Athens" may be used to query a photo website for user image related to the search query. It may be appreciated that the user images and/or other user generated content may be created by more than one user (e.g., a first image created by Dan, a second image created by Colleen, etc.). The user generated content may be retrieved based upon analyzing metadata associated with user generated content. For example, user generated content may be selectively retrieved based upon tagging data, user voting data, descriptive data, comments, frequency of access, amount of access, and/or other metrics used to evaluate the quality and relevancy of the user generated content in relation to the search query.

At least some of the user generated content may be grouped into one or more clusters. A cluster may be defined based upon features (e.g., visual and textual features) extracted from the user generated content. For example, the user generated content may comprise photos of a beach, sea life, dance clubs, resorts, etc. Features such as water activities, nightlife, vacation hotels, etc. may be extracted from the user generated content. The features may be used to define clusters (e.g., a cluster corresponding to water activities). User generated content may be placed within corresponding clusters (e.g., images dealing with water activities may be grouped into the water activities cluster). In this way, similar user generated content (e.g., content corresponding to a particular feature of a location) may be grouped into corresponding clusters. In one example, a multimodal Dirichlet Process Mixture Sets model may be used to define clusters based upon the user generated content. It may be appreciated that descriptive names may be assigned to clusters. In one example, a machine learning technique and/or data mining technique may be used to determine a descriptive name. In another example, a TF-IDF measure may be used to extract features of a cluster, which may be used to descriptively name the cluster. In another example, a regression model may be used to score terms and/or phrases associated with the cluster.

It may be appreciated that search results may be obtained from the search query. For example, search results may be obtained from a general purpose search engine using the search query. Because the search results may be unorganized, redundant, and/or unhelpful, the one or more clusters of user generated content may be used to organize the search results. That is, the user generated content may exemplify high-quality, interesting, diverse, and/or desired content relating to the search query. Furthermore, the user generated content is organized into clusters based upon similar features (e.g., images associated with water activities of a location may be grouped into a water activity cluster). The one or more clusters of user generated content may provide a "comparison model" illustrating what users may desire from the search results. In this way, the search results may be organized based upon the one or more clusters. In one example, the search results may be organized based upon a multimodal Dirichlet Process Mixture Sets model that may rank search results based upon search results corresponding to (having similar features as) topics associated with the one or more clusters. In another example, the multimodal Dirichlet Process Mixture Sets model may rank the search results based upon search results corresponding to (having similar features as) extracted features of user generated content within the one or more clusters.

The organized search results may be presented. In one example, the organized search results may be presented within a web browser hosting a search engine through which a user submitted the search query. It may be appreciated that the organized search results may be presented through a variety of mediums (e.g., an application, a web service, web page, etc.). In another example, an interactive table of content comprising at least some of the clusters and/or at least some of the user generated content may be generated. For example, the interactive table of contents may comprise a list of descriptive names associated with the one or more clusters. A predetermined number (e.g., 3) of thumbnails exemplifying user generated content of a cluster may be displayed with a corresponding descriptive name of the cluster. It may be appreciated that a user may select a cluster (e.g., select a descriptive name or a thumbnail associated with a cluster) to reorganize the organized search results based upon the selected cluster. This allows a user to narrow down and refine the organized search results to a particular topic of a cluster.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
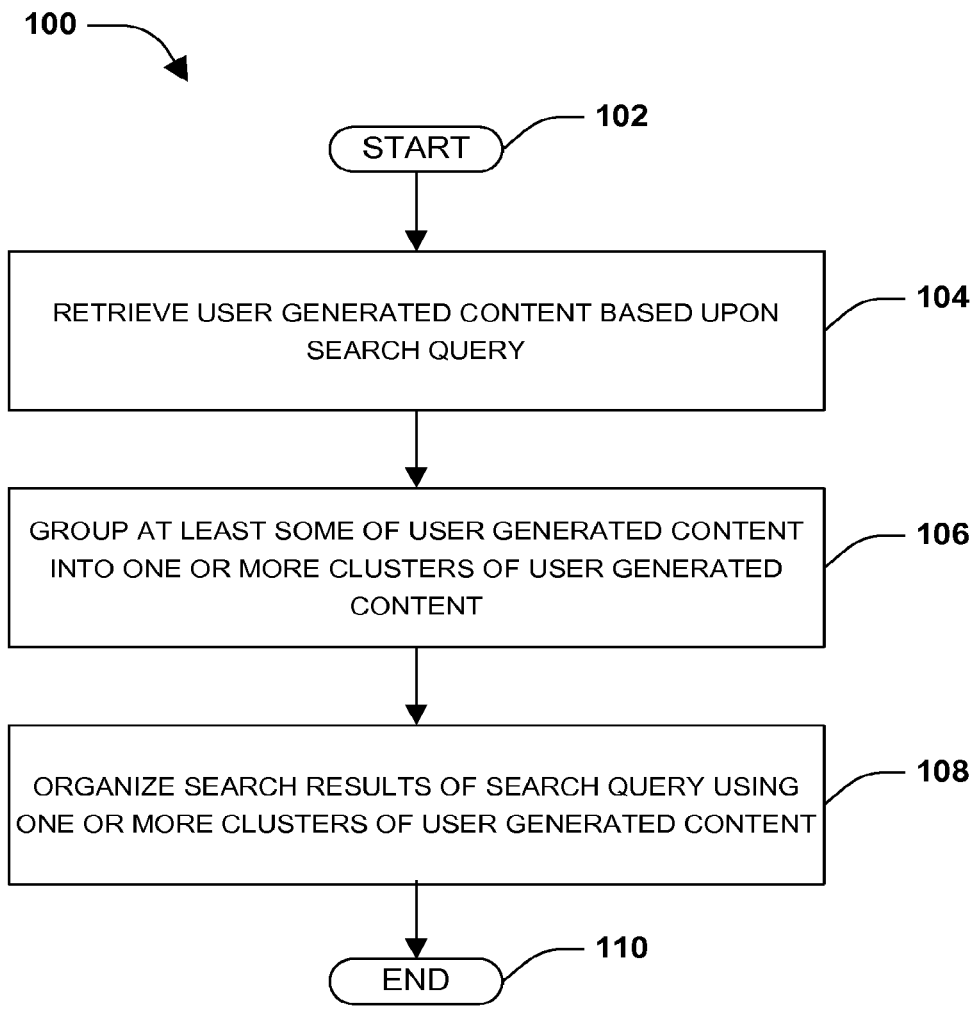
FIG. 1 is a flow chart illustrating an exemplary method of organizing search results.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A user's internet experience may be enhanced by providing organized, diverse, and high-quality information relevant to the user's interests. Search engines provide a hub to help direct users to useful internet content. In an attempt to improve search engines, query classifying may be used to better understand a user's search intent. Unfortunately, search engines may still provide search results that are redundant, such as images differing only in size, and irrelevant, such as results returned based upon word ambiguity. Furthermore, the search results may be unorganized. A user may be left to sift through thousands of unorganized search results in an attempt to locate desired content.

Accordingly, one or more systems and/or techniques for organizing search results are provided herein. In particular, user generated content may be leveraged to organize search results. That is, user generated content may exemplify desired features of "people, places, and/or things". For example, highly recommended user photos of Mt. Everest may depict a desired "view" of Mt. Everest (e.g., photos having positive comments or votes through an image sharing website), as opposed to low quality and/or poorly taken photos. In this way, search results from a general purpose search engine may be organized and/or filtered based upon the user generated content. In one example, redundant and/or irrelevant results may be excluded. In another example, search results having features corresponding to (matching) features of "desired" user generated content may be ranked higher than other search results. For example, a user image of Mt. Everest may depict a desired view of Mt. Everest, thus search results similar to the user image may be ranked higher than image having an undesirable view. In another example, an interactive table of content may be provided, which may allow a user to dynamically reorganize the organized search results based upon topics associated with clusters of user generated content.

One embodiment of organizing search results is illustrated by an exemplary method 100 in FIG. 1. At 102, the method beings. At 104, user generated content may be retrieved based upon a search query. The search query may relate to a query inputted into a general purpose search engine by a user. It may be appreciated that user generated content may comprise images, text, blog information, URLs, videos, music, a user profile, advertisements, and/or other content generated by users. User generated content may be retrieved based upon matching the search query with metadata associated with user generated content. For example, tagged data, user voting data, descriptive data, comments, frequency of access, amount of access, and/or other data associated with user generated content may be utilized in retrieving user generated content corresponding to the search query. It may be appreciated that the user generated content may exemplify various aspects of the search query. For example, user generated content may illustrate diverse subject matter, such as water activities, restaurants, resorts, flights, tours, etc., associated with a search query, such as "Bora Bora". The user generated content may be deemed desirable to users (e.g., "high" quality) based upon analyzing the metadata. For example, users may have voted a picture as "most professional" and/or may have provided positive comments regarding the content of the picture. In this way, the user generated content may relate to diverse content that users find desirable.

It may be appreciated that user generated content may be retrieved from one or more locations. For example, user generated content may be retrieved from a first source and a second source different from the first source. The first source may be remote from the second source. For example, a first source may be an image database owned by company A and a second source may be an image website hosted by company B. In one example of retrieving user generated content, a plurality of images created by more than one user may be retrieved.

At 106, at least some of the user generated content may be grouped into one or more clusters of user generated content. Grouping the user generated content into clusters may provide organization of the user generated content based upon features extracted from the user generated content. In particular, user generated content having similar features may be grouped together. For example, user generated content relating to water activities may be grouped into a cluster.

In one example, user generated content may comprise user images related to a search query for images of "Bora Bora". The user images may relate to nearby beaches, underwater photos of sea life, friends, nightlife excursions, romantic dinners, resorts, particular landmarks, etc. Visual, textual, and/or descriptive features of the user images may be extracted. In one example, descriptive and/or textual features may be extracted from metadata of an image (e.g., users tagging the image, users voting the image as excellent, a caption describing the image, user comments for the image, word occurrence, etc.). In another example, visual features may be extracted from an image (e.g., a visual sift descriptors, a determination that water is depicted within the image, a determination that a building is depicted within the image, etc.).

The extracted features may be used to define clusters. In one example, a multimodal Dirichlet Process Mixture Sets model may be used to define clusters based upon extracted features of the images. For example, a restaurant cluster may be defined based upon at least some images relating to restaurants. That is, a sufficient number of images may relate to restaurants, thus a cluster may be defined for restaurant because the images relating to restaurants may be grouping into the restaurant cluster.

The user content may be grouped into the corresponding clusters. For example, images having features relating to water activities may be grouped into a water activities cluster. In this way, at least some of the user content may be grouped into clusters. A multimodal Dirichlet Process Mixture Sets model may be used to group the user content into the clusters. For example, user content having features related to a defined cluster may be grouped into the cluster. A descriptive name may be assigned to a cluster based upon features of the cluster. For example, a TF-IDF measure may be used to extract a key phrase, which may be assigned to the cluster. It may be appreciated that a variety of machine learning techniques and/or data mining techniques may be used to determine a descriptive name for a cluster. A descriptive name of a cluster may be indicative of common features between user generated content within the cluster. It may be appreciated that a topic may be assigned to a cluster. That is, the topic may describe a commonality between images within a cluster. In one example, a topic may be a category of a cluster derived from visual, textual, and/or descriptive features of user generated content within the cluster.

At 108, search results of the search query may be organized using the one or more clusters of user generated content. It may be appreciated that the search results may be obtained based upon submitting the search query to a general purpose search engine. In one example, a multimodal Dirichlet Process Mixture Sets model may be executed upon the search results using the one or more clusters. In particular, search results having features similar to topics assigned to the one or more cluster and/or features similar to features of user generated content within the clusters may be ranked higher than search results lacking features similar to the clusters and/or user generated content.

In one example, search results of "Parthenon in Athens" may return images of novelty mugs, images of the Parthenon, toga party information, a book concerning ancient Greece, etc. The one or more clusters may have topics related to nightlife in Athens, desired beaches in Greece, local historical sites in Athens, recommended images of the Parthenon, etc. In one example, search results may be ranked based upon whether a search result has features similar to topics of the one or more clusters. In another example, a search result of an image of the Parthenon having similar visual features as a cluster comprising a recommended image of the Parthenon may be ranked higher than a novelty mug of the Parthenon.

The organized search results may be presented. The organized search results may reflect a diverse set of relevant search results that other users may have determined as being desirable and/or useful (e.g., a high-quality image as opposed to a small low quality image). An interactive table of content may be presented within the organized search results. In particular, the interactive table of content may be generated based upon the one or more clusters. For example, the interactive table of content may comprise topics or descriptive names associated with clusters and/or a sampling of user generated content from respective clusters. The interactive table of content may allow users to reorganize the search results based upon a selected cluster. In this way, a user may narrow the organized search results to a particular aspect or features of the search query. At 110, the method ends.

Figure 2:
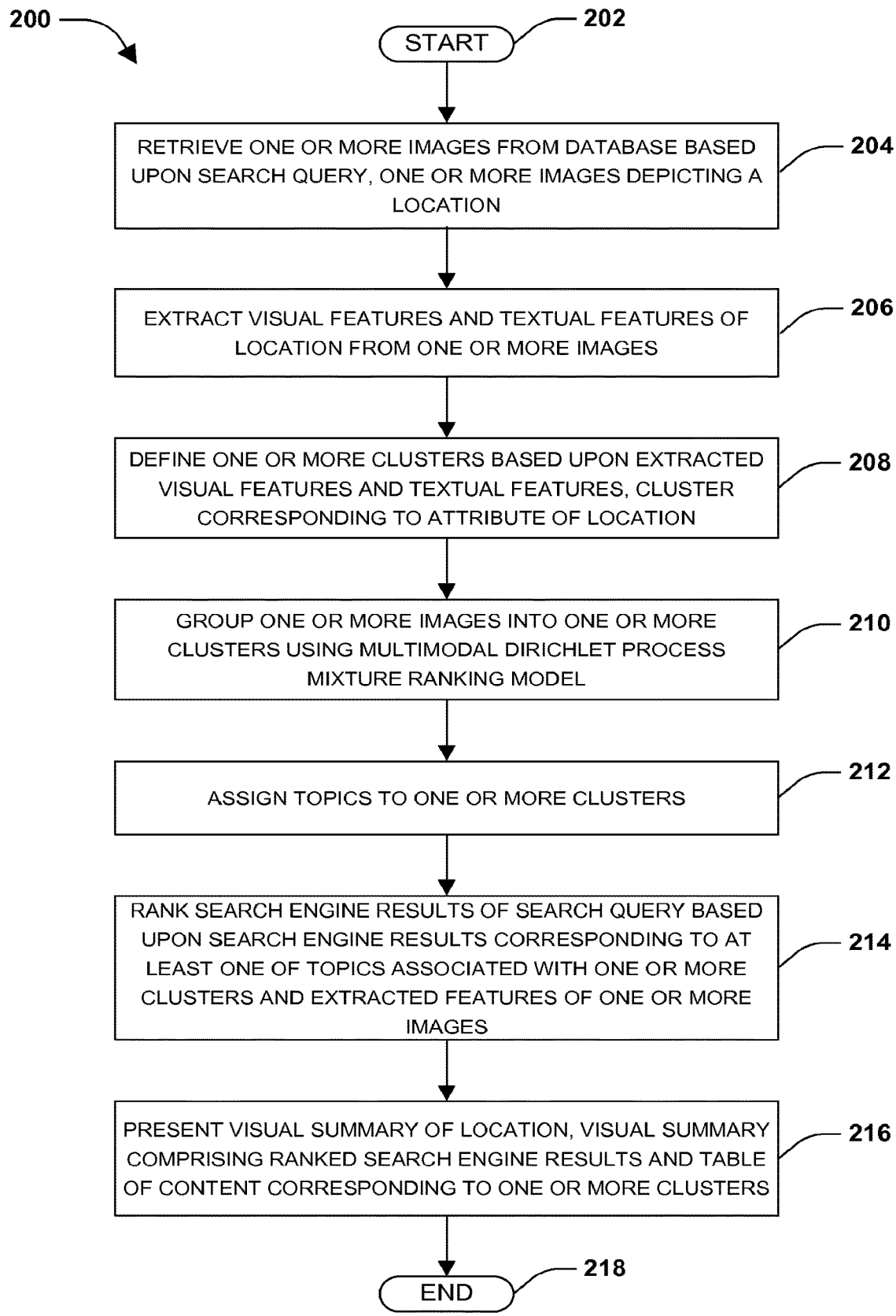
FIG. 2 is a flow chart illustrating an exemplary method of presenting a visual summary of a location corresponding to a search query.

One embodiment of presenting a visual summary of a location corresponding to a search query is illustrated by an exemplary method 200 in FIG. 2. At 202, the method beings. At 204, one or more images (user generated content) may be retrieved from a database based upon a search query. It may be appreciated that the search query may relate to a location (e.g., a city, a historical site, a scene, neighborhood, a house, beach, a room within a building, planet earth depicted by satellite imagery, and/or any other location). Accordingly, the one or more images may depict the location in a manner desired by users (e.g., a map of the location, a photo of the location, a photo of an item at the location, a photo of a person at the location, and/or other images associated with the location). That is, the one or more images may be retrieved based upon the one or more images having a high approval rating (e.g., positive user comments, multiple users tagging an image, multiple users rating the image as "profession" or "excellent", etc.).

At 206, visual features and/or textual features of the location may be extracted from the one or more images. In particular, features may be extracted from metadata and/or visual image data associated with an image. For example, features of water, activity, snorkeling, vacation, and/or other features may be extracted from an image of people snorkeling in water. At 208, one or more clusters may be defined based upon extracted visual features and textual features. A cluster may correspond to an attribute of the location. For example, a cluster may correspond to historical sites near the location, while another cluster may correspond to restaurants near the location. At 210, the one or more images may be grouped into the one or more clusters using a multimodal Dirichlet Process Mixture Sets model. In particular, images having features corresponding to features of a cluster may be grouped into the cluster. In this way, a cluster may comprise images having similar features representative of an attribute of the location.

At 212, topics may be assigned to the one or more clusters. A topic may correspond to features associated with a cluster. For example, a topic of "water activities" may be assigned to a cluster comprising images associated with water activities available at the location (e.g., photos of: vacationers swimming in the ocean, vacationers scuba diving, etc.). At 214, search engine results of the search query may be ranked using the one or more clusters. In particular, a search engine result may be ranked based upon whether the search engine result corresponds to (matches) a topic assigned to a cluster and/or corresponds to (matches) features of user images within a cluster. It may be appreciated that a determination of whether a search engine result corresponds to a topic may comprise determining whether the search engine result has features (visual, textual, descriptive) corresponding to features of images within a cluster. In this way, undesired search engine results may be ranked low, while desired search engine results matching topics assigned to clusters and/or features of images within clusters may be ranked high.

At 216, a visual summary of the location may be presented. The visual summary may comprise the ranked search engine results and/or a table of content corresponding to the one or more clusters. The table of content may comprise at least some of the clusters and/or at least some of the image within the clusters. In one example, the table of content may organize clusters based upon topics associated with respective clusters. At 218, the method ends.

Figure 3:
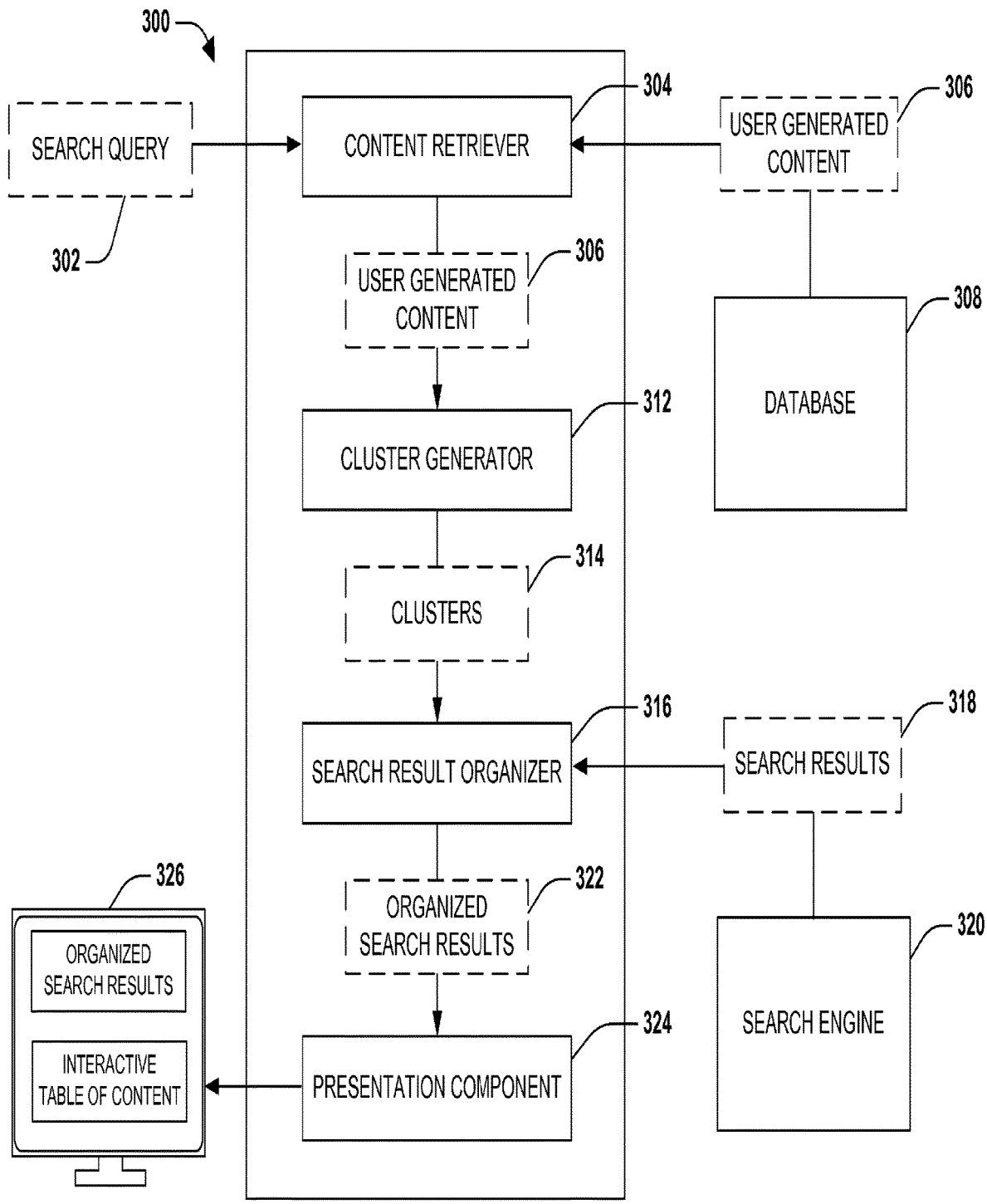
FIG. 3 is a component block diagram illustrating an exemplary system for organizing search results.

FIG. 3 illustrates an example of a system 300 configured to organizing search results 318. The system 300 may comprise a content retriever 304, a cluster generator 312, a search result organizer 316, and/or a presentation component 324. The content retriever 304 may be configured to retrieve user generated content 306 based upon a search query 302. In one example, the search query 302 may correspond to a query entered into a search engine (e.g., a search engine 320) by a user. The content retriever 304 may be configured to retrieve the user generated content 306 from within a database 308. It may be appreciated that the content retriever 304 may retrieve the user generated content 306 from other sources, such as a website (e.g., a searchable photo sharing website).

The cluster generator 312 may be configured to group at least some of the user generated content 306 into one or more clusters 314. For example, the cluster generator 312 may execute a multimodal Dirichlet Process Mixture Sets model upon the user generated content 306 to extract features (e.g., visual, textual, descriptive), which may be used to group at least some of the user generated content having similar features into corresponding clusters. The cluster generator 312 may be configured to define topics for the one or more cluster 314 based upon visual features, textual features, and/or other descriptive features extracted from the user generated content 306 within respective clusters 312. The cluster generator 312 may be configured to assign a descriptive name to a cluster based upon machine learning techniques and/or data mining techniques. For example, the cluster generator 312 may be configured to compute a TF-IDF measure of features associated with the cluster. A key phrase representative of the content of the cluster may be determined based upon scoring words associated with the cluster using the TF-IDF measure. The key phrase may be assigned as a descriptive name for the cluster.

The search result organizer 316 may be configured to organize search results 318 of the search query 302 using the one or more clusters 314. In one example, the search result organizer 316 may rank the search results 318 based upon determining that at least some of the search results correspond to topics assigned to the one or more clusters 314 and/or correspond to features of user generated content 306 within the one or more clusters 314. For example, the search result organizer 316 may execute a multimodal Dirichlet Process Mixture Sets model upon the search results 318 using the one or more clusters 314. That is, the search result organizer 316 may execute a multimodal Dirichlet Process Mixture Sets model to determine which search results have similar features as features of user generated content 306 within the one or more clusters 314. In this way, organized search results 322 may be determined. The organized search results 322 may comprise ranked search results.

The presentation component 324 may be configured to present the organized search results 322 and/or an interactive table of content. For example, the presentation component 324 may present a visual summary 326 comprising the organized search results 322 and the interactive table of content. The interactive table of content may comprise at least some of the clusters 314. The interactive table of content may display descriptive names of at least some of the clusters 314. The interactive table of content may display at least some of the user generated content associated with the presented clusters. The interactive table of content may be configured to allow a user to select a cluster (e.g., click or invoke a descriptive name of a cluster) in order to reorganize the organized search results 322. This allows a user to narrow down the organized search results 322 based upon features or topics of a cluster. For example, the organized search results 322 may comprise a diverse spread of images associated with "Bora Bora". A user may invoke a cluster having a topic "water activities". The interactive table of content may filter at least some of the organized search results 322 that do not correspond to "water activities", for example.

Figure 4:
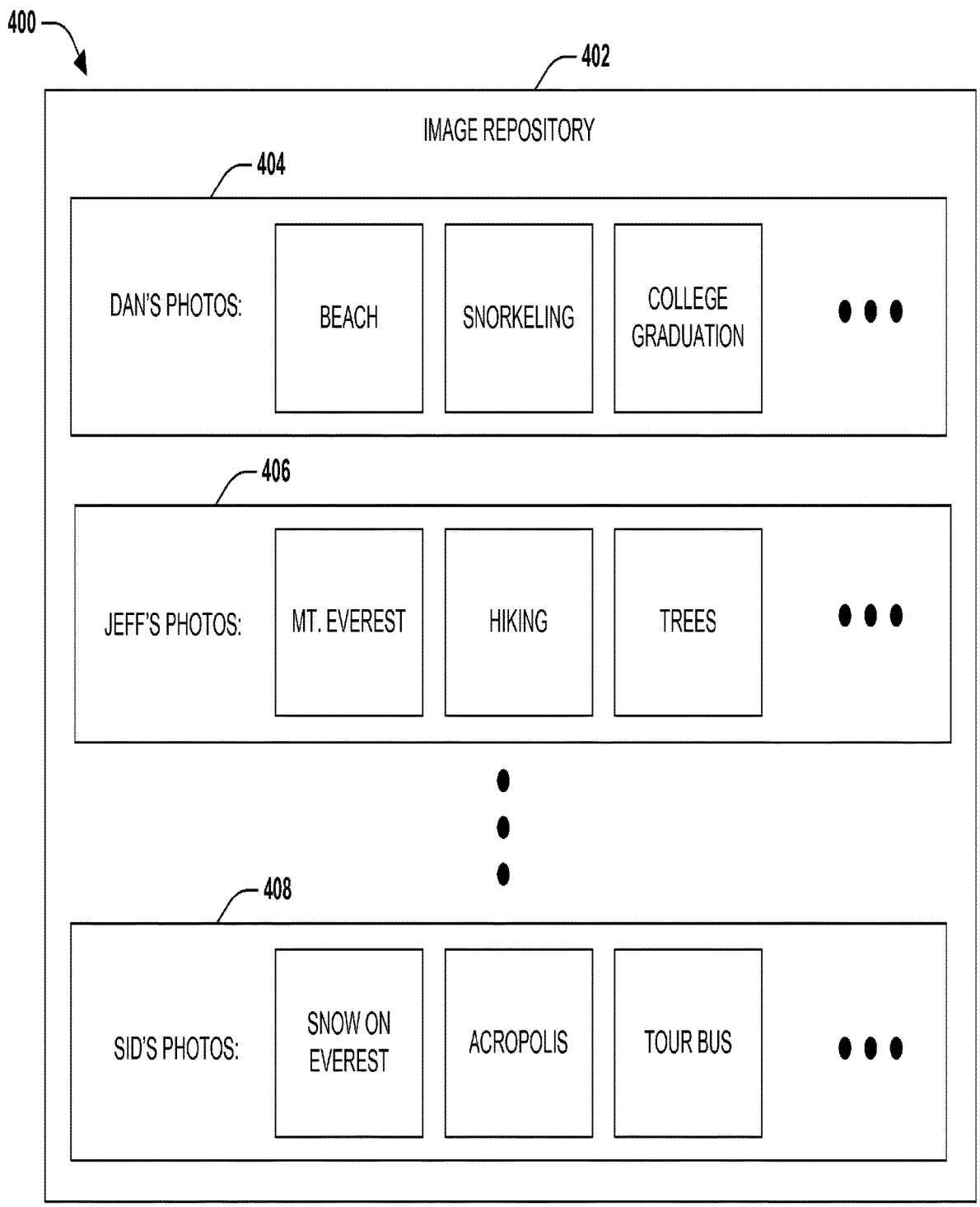
FIG. 4 is an illustration of an example of an image repository.

FIG. 4 illustrates an example 400 of an image repository 402. In one example, the image repository 402 may be a database directly accessible through database queries. In another example, the image repository 402 may be associated with a website and/or application, such that images may be retrieved through the website and/or application (e.g., a query submitted to an image sharing website). It may be appreciated that the image repository 402 may comprise hundreds of thousands of images that may be associated with a variety of users. The image repository 402 may store the images in an organized or unorganized manner. In one example, metadata associated with an image may be available within the image repository 402 and/or may be available from a source remote to the image repository 402 (e.g., a website utilizing the image repository 402).

Example 400 illustrates the image repository 402 comprising photos associated with users. For example, a beach photo, a snorkeling photo, a college graduation photo, and/or a variety of other photos may be associated with a user Dan 404. A Mt. Everest photo, a hiking photo, a trees photo, and/or a variety of other photos may be associated with a user Jeff 406. A snow on Everest photo, acropolis photo, a tour bus photo, and/or a variety of other photos may be associated with a user Sid 408. Metadata associated with the images may be available. For example, users of a website associated with the image repository 402 may have voted the snorkeling photo as "excellent". The users may have also provided positive comments for the snorkeling photo. In this way, Dan's snorkeling photo may be treated as a desired image. For example, the snorkeling photo may provide a high-quality representation of an attribute (a water activity) of a location.

It may be appreciated that images within the image repository 402 may be retrieved based upon a search query. In one example, the search query may be used to retrieve images directly form the image repository 402. In another example, the search query may be submitted to a website associated with the image repository 402. The retrieved images may represent desired user generated content that may be used as a model to compare, organize, rank, and/or filter search engine results of the user query.

Figure 5:
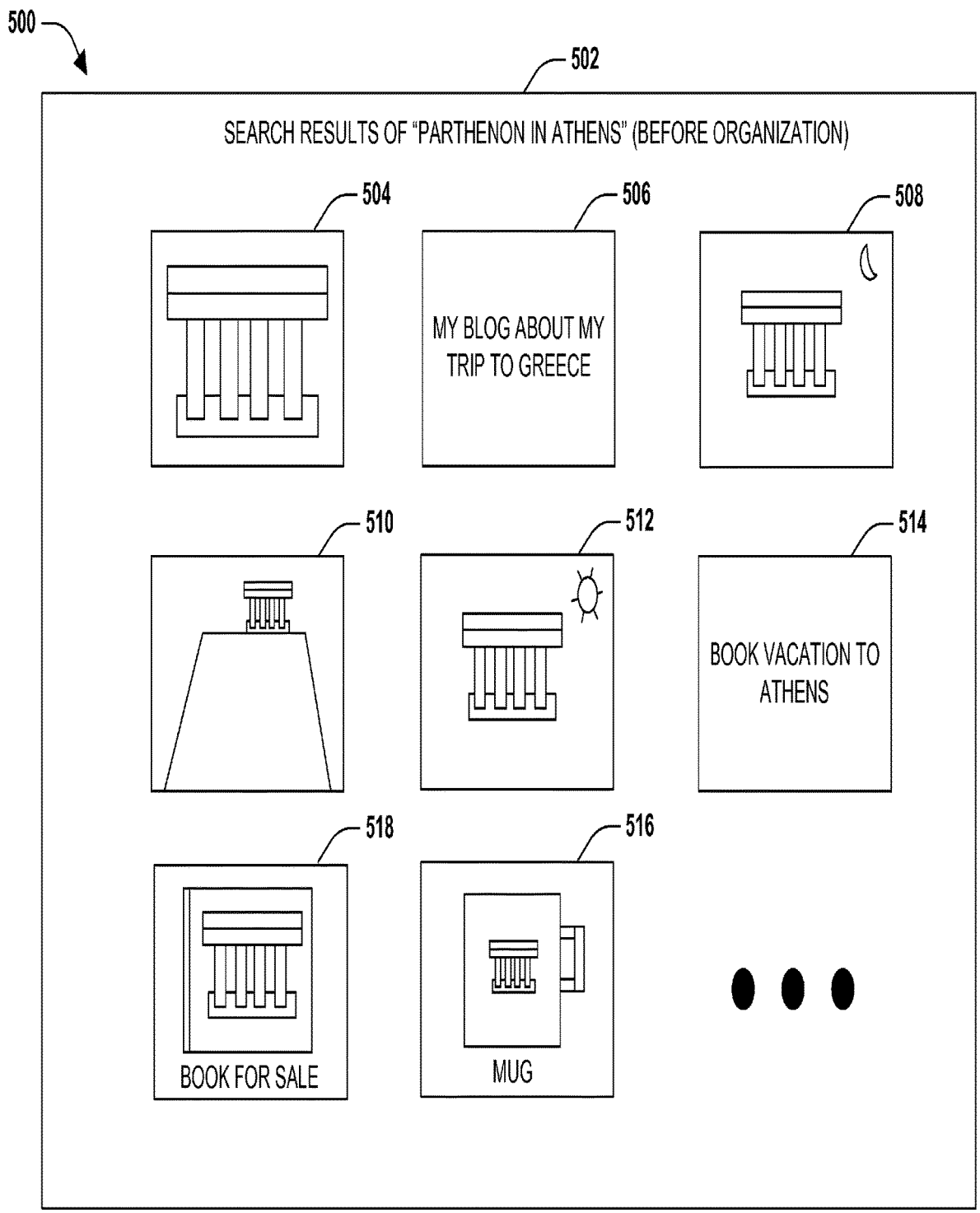
FIG. 5 is an illustration of an example of search results of a search query before organization.

FIG. 5 illustrates an example 500 of search results 502 of a search query before organization. A user may submit a search query "Parthenon in Athens" to a general purpose search engine. The search engine may return hundreds of thousands of results corresponding to the search query "Parthenon in Athens". For example, a high-quality image of the Parthenon 504 may be returned. A blog about a person's trip to Greece 506 may be returned. An image of the Parthenon at night 508 may be returned. A low quality image of the Parthenon at a bad angle 510 may be returned. A highly desired image of the Parthenon at sunrise 512 may be returned. An advertisement relating to vacations in Athens 514 may be returned. A school text book associated with Greece 518 may be returned. A mug comprising an image of the Parthenon 516 may be returned. It may be appreciated that a wide variety of other content may be returned within the search result 502.

Unfortunately, the user may have an interest (a search intent) in obtaining vacation information relating to Greece, Athens, and/or the Parthenon. That is, the user may be attempting to research Greece and its attractions by submitting search queries to the search engine. However, the search results may comprise a plethora of redundant, uninformative, and/or irrelevant content. For example, the user interested in vacation information of Greece, may be uninterested in: the low quality image of the Parthenon at a bad angle 510, the school text book associated with Greece 518, the mug comprising an image of the Parthenon 516, and/or other search results. Without organization, the user may be left to sift through the search results 502 for desired content.

Figure 6:
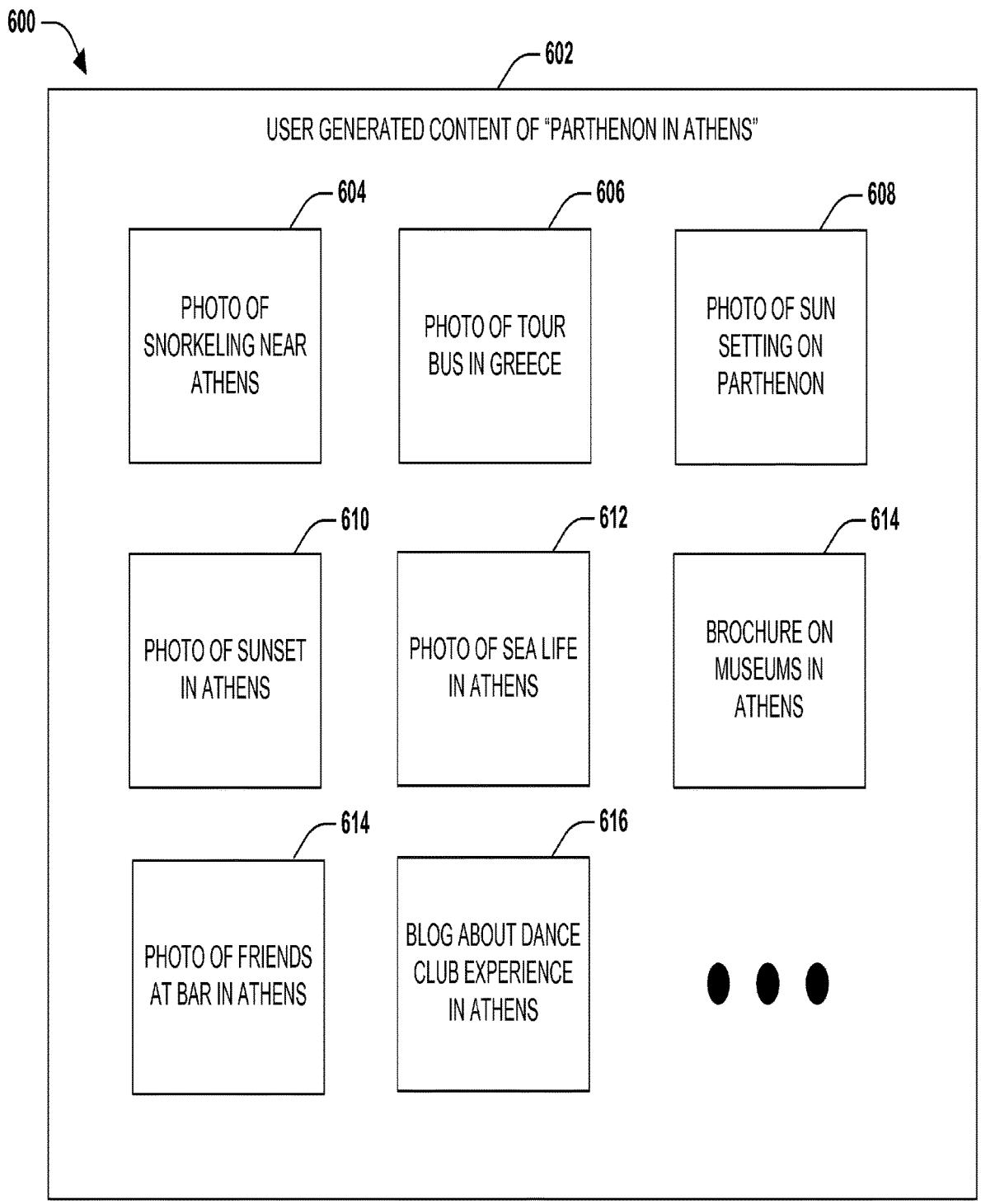
FIG. 6 is an illustration of an example of user generated content corresponding to a search query.

FIG. 6 illustrates an example 600 of user generated content 602 corresponding to a search query. A user may submit a search query "Parthenon in Athens" to a search engine. The search query "Parthenon in Athens" may be used to collect additional data that may be useful in organizing search results (e.g., search results 502 of FIG. 5) that may be provided by the search engine to the user. In particular, the search query "Parthenon in Athens" may be used to retrieve user generated content 602. It may be appreciated that the user generated content 602 may be deemed as desired content relating to the search query "Parthenon in Athens" because the user generated content 602 may come "highly recommended" by users based upon voting, comments, tagging data, and/or a variety of other criteria that may be used to judge user generated content. For example, a top 500 popular images returned by a image sharing website may be retrieved as the user generated content 602.

It may be appreciated that "noisy" user generated content may be excluded based upon respective levels of interest one or more users showed in the user generated content. For example, a nightview image of a location that users rated high may be used, while images that users found uninteresting may be excluded. In this way, the diverse set of user content may comprise user content that may represent true aspects of something (e.g., a true/popular attraction of a location as opposed to something uninteresting to users). The interesting user generated content may be used, for example, for cluster generation and/or organization/ranking, while other content is filtered out.

In one example, the search query "Parthenon in Athens" may be submitted to a social network website. The social network website may comprise user generated content, such as blogs, photos, brochures, advertisements, user profiles, text, etc. Metadata may be associated with the user generated content. For example, a photo may comprise metadata describing the content of the photo, what users think of the photo, how many users tagged the photo, etc. The metadata may be used to extract features of the photo to determine what user generated content 602 may be advantageous to retrieve. For example, a photo of snorkeling near Athens 604 may be retrieved based upon metadata indicating users desire the photo. In this way, other user generated content may be retrieved, such as a photo of a tour bus in Greece 606, a photo of a sun setting on the Parthenon 608, a photo of a sunset in Athens 610, a photo of sea life in Athens 612, a brochure on museums in Athens 614, a photo of friends at a bar in Athens 612, a blog about a dance club experience in Athens 616, and/or other desired user generated content relating to the search query "Parthenon in Athens". It may be appreciated that the user generated content 602 may comprise a variety of desired content that may span a various categories corresponding to the search query "Parthenon in Athens". For example, at least some of the user generated content may relate to water activities, while other user generated content may relate to tourist attractions. In this way, a diverse set of user generated content covering various aspects of the search query "Parthenon in Athens" may be retrieved.

Figure 7:
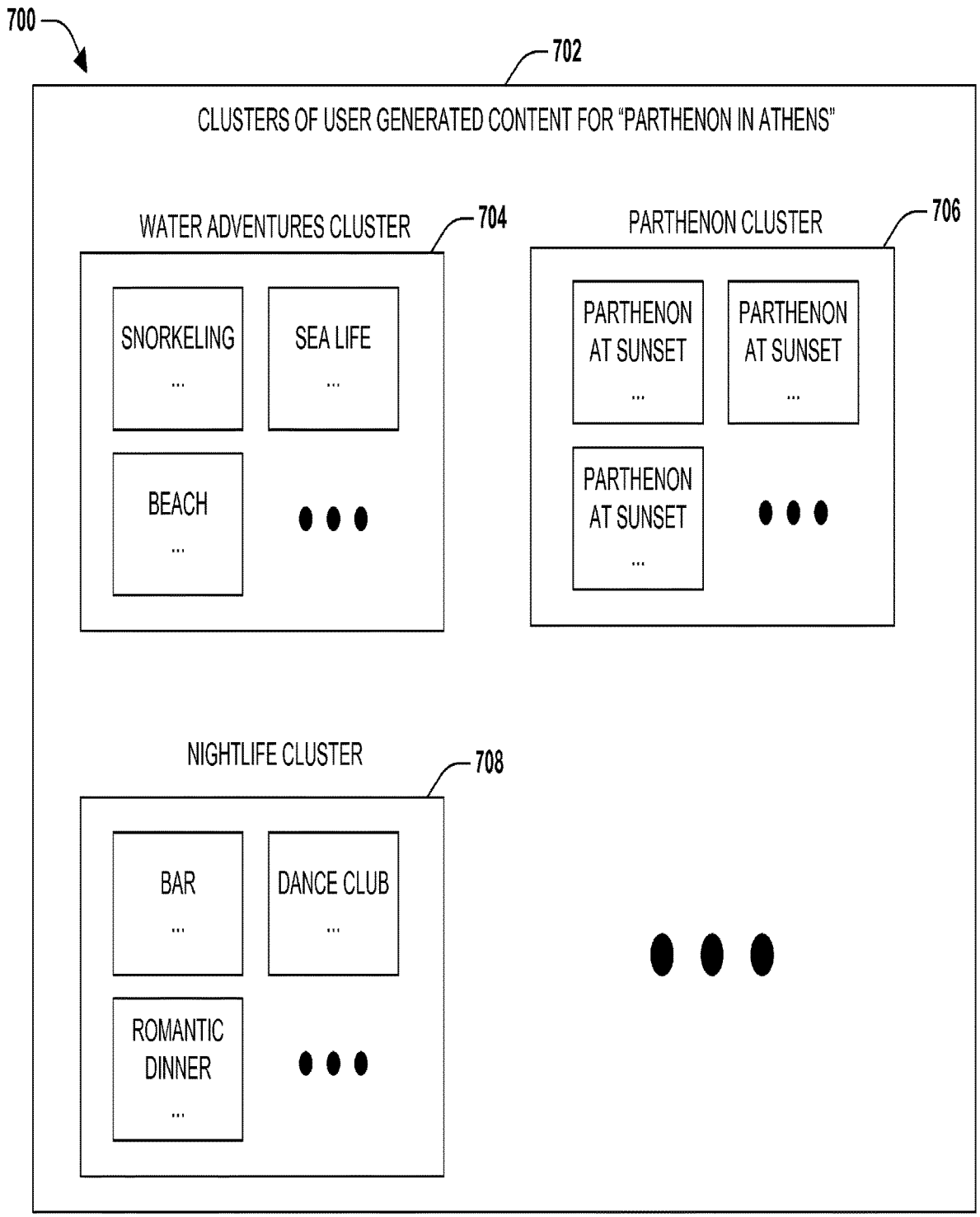
FIG. 7 is an illustration of an example of grouping user generated content into clusters based upon extracted features of the user generated content.

FIG. 7 illustrates an example 700 of grouping user generated content into clusters 702 based upon extracted features of the user generated content. User generated content (e.g., user generated content 602 of FIG. 6) may related to various aspects of a search query (e.g., search query "Parthenon in Athens"). It may be useful to group at least some of the user generated content into clusters defining various attributes of the search query. For example, some of the user generated content may relate to nightlife activities in Athens, while other user generated content may relate to water adventures near the Parthenon.

In one example, clusters may be defined based upon extracting visual, textual, and/or other descriptive features of various user generated content. For example, features of water adventures, nightlife, Parthenon, vacations in Athens, and/or other features may be extracted. The extracted features may be used to define clusters. For example, a water adventures cluster 704, a Parthenon cluster 706, a nightlight cluster 708, and/or other clusters may be defined. It may be appreciated that topics may be assigned to clusters based upon how a cluster is defined and/or based upon user generated content already grouped within a cluster. At least some of the user generated content may be grouped into the clusters based upon user generated content corresponding to (e.g., matching) topics of clusters. In one example, a multimodal Dirichlet Process Mixture Sets model may be used to define the clusters 702 and/or group user generated content into corresponding clusters. For example, user generated content relating to snorkeling, sea life, beaches, etc. may be grouped into the water adventures cluster 704. User generated content relating to one or more images of the Parthenon at night may be grouped into the Parthenon cluster 706. Similarly, user generated content relating to one or more images of the Parthenon at sunset may be grouped into the Parthenon cluster 706, although it may be more likely that night-time and sunset images are grouped into different clusters. User generated content relating to bars, dance clubs, romantic dinners, etc. may be grouped into the nightlife cluster 708. It may be appreciated that clusters may be defined in a variety of ways such that one or more images may be comprised in a cluster (e.g., images of the Parthenon at night may be a first cluster, images of the Parthenon at sunset may be a second cluster, images of the Parthenon during the day may be a third cluster, etc.) It may be appreciated that descriptive names may be assigned to the clusters 702.

It may be appreciated that the clusters 702 may be utilized in organizing search results (e.g., search results 502). For example, a multimodal Dirichlet Process Mixture Sets model may be used to rank search results that correspond to topics assigned to cluster 702 and/or extracted features of user generated content within the clusters 702. That is, a search result that matches a topic of a cluster and/or features of user generated content may be ranked high, while search results that do not match a topic of a cluster and/or features of user generated content may be ranked low. In this way, the search results may be ranked according to how closely search results match user generated content.

Figure 8:
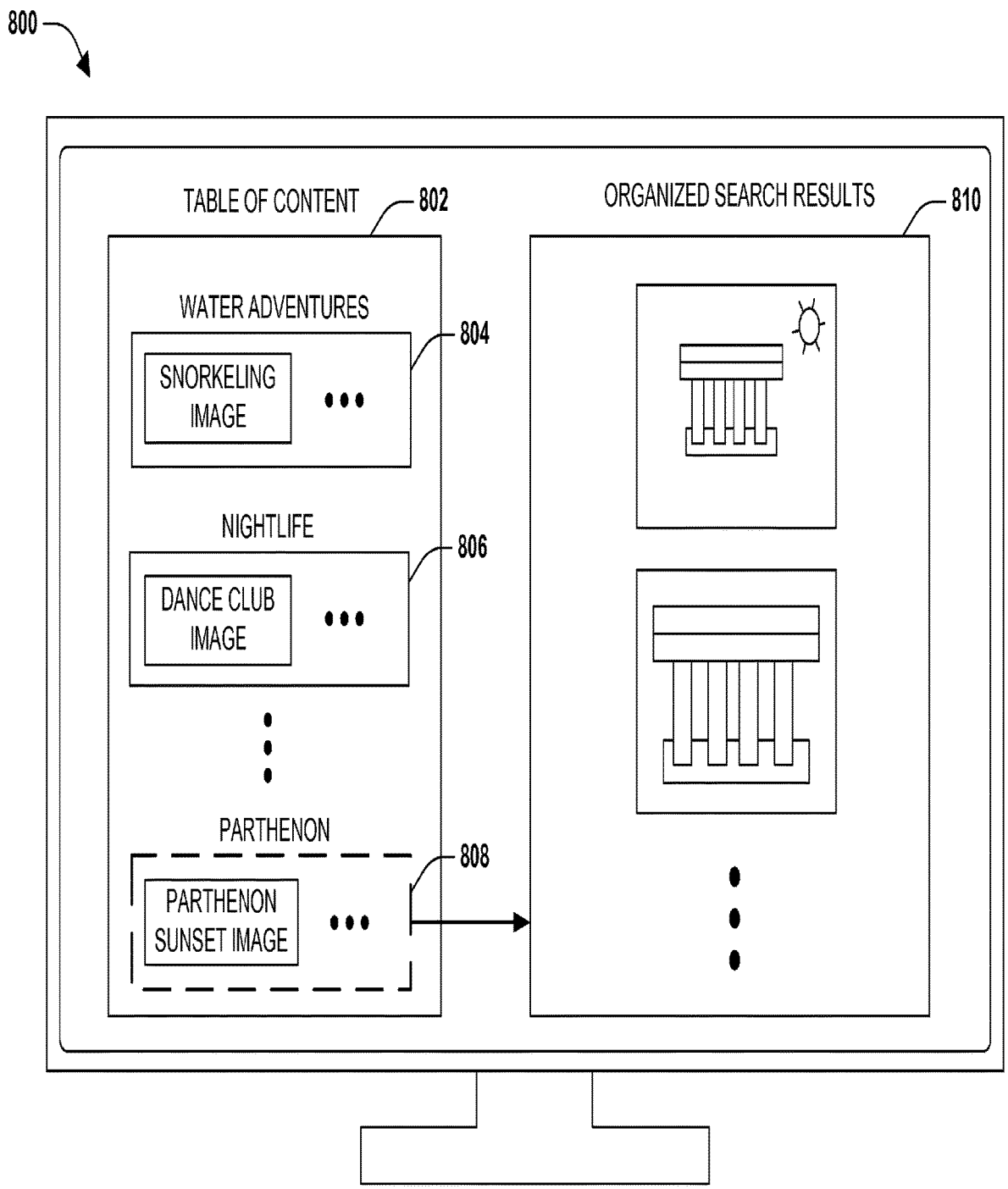
FIG. 8 is an illustration of an example of presenting organized search results based upon user selection of a cluster within a table of content.

FIG. 8 illustrates an example 800 of presenting organized search results 810 based upon user selection of a cluster within a table of content 802. In one example, a user may submit a search query "Parthenon in Athens". User generated content (e.g., snorkeling image, dance club image, Parthenon sunset image, etc.) may be retrieved based upon the search query. The user generated content may be grouped into clusters (e.g., a water adventures cluster 804, a nightlife cluster 806, a Parthenon cluster 808, etc.). Descriptive names and/or topics may be assigned to the clusters (e.g., water adventures, nightlife, Parthenon, etc.).

The table of content 802 comprising at least some of the clusters may be presented. It may be appreciated that the table of content may be presented in a variety of ways. For example, descriptive names may be presented, thumbnails of user generated content may be presented, textual hyperlinks of user generated content may be presented, and/or a variety of other information relating to the clusters may be presented in various ways. In example 800, the table of content 802 comprises descriptive names of clusters and thumbnails of user generated content within the clusters.

Organized search results 810 may be presented. It may be appreciated that user selection within the table of content 802 may reorganize the organized search results 810. The organized search results 810 is illustrated to show what the organized search results 810 may comprise after a user selects a cluster to reorganize the organized search results 810. Based upon the user selecting the Parthenon cluster 808, the organized search results 810 may be reorganized to comprise search results corresponding to the Parthenon cluster 808, while search results that do not correspond to the Parthenon cluster 808 may be excluded. Reorganizing the organized search results 810 allows a user to narrow down search results in an organized manner.

Figure 9:
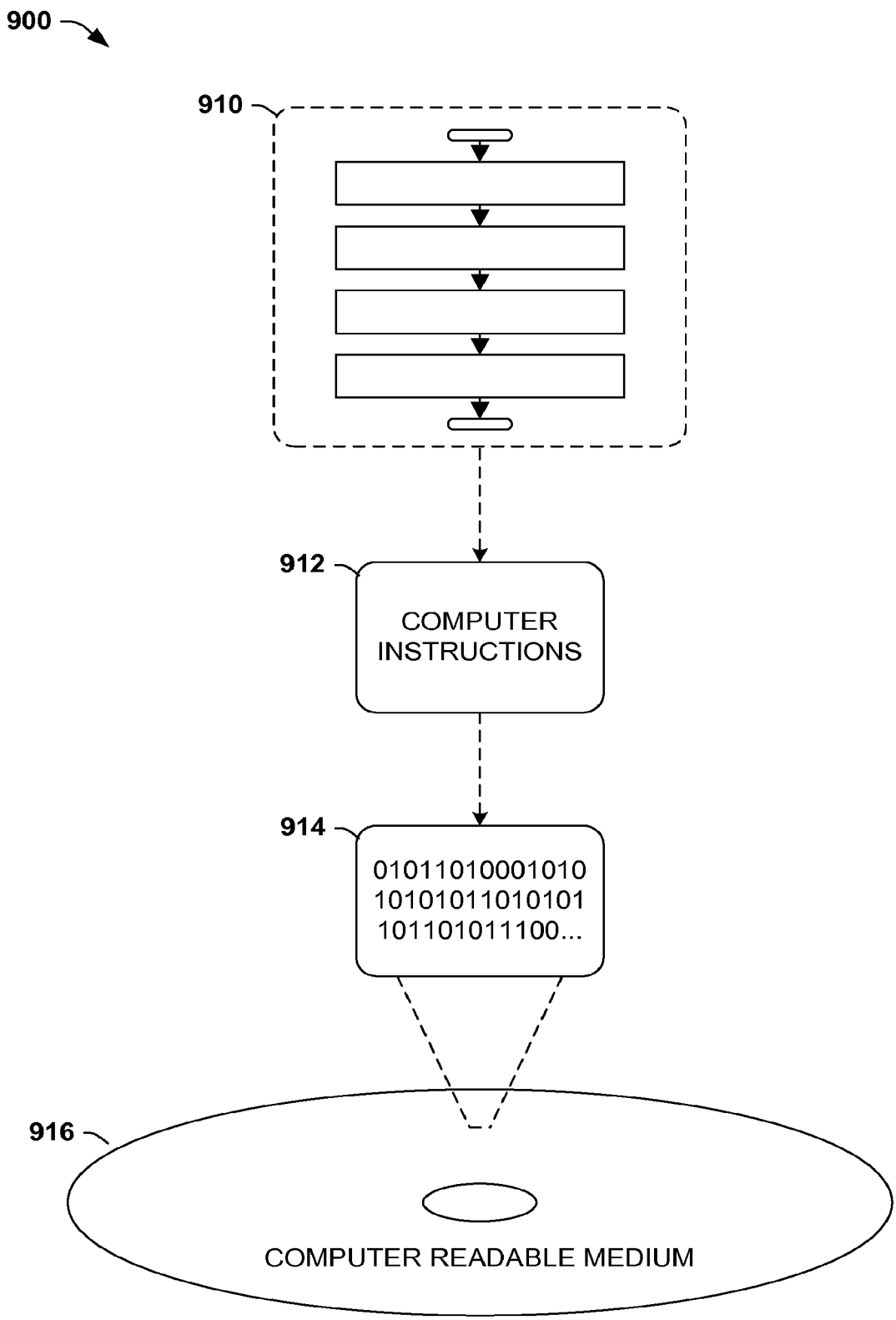
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as the exemplary method 100 of FIG. 1 and/or the exemplary method 200 in FIG. 2, for example. In another such embodiment, the processor-executable instructions 912 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
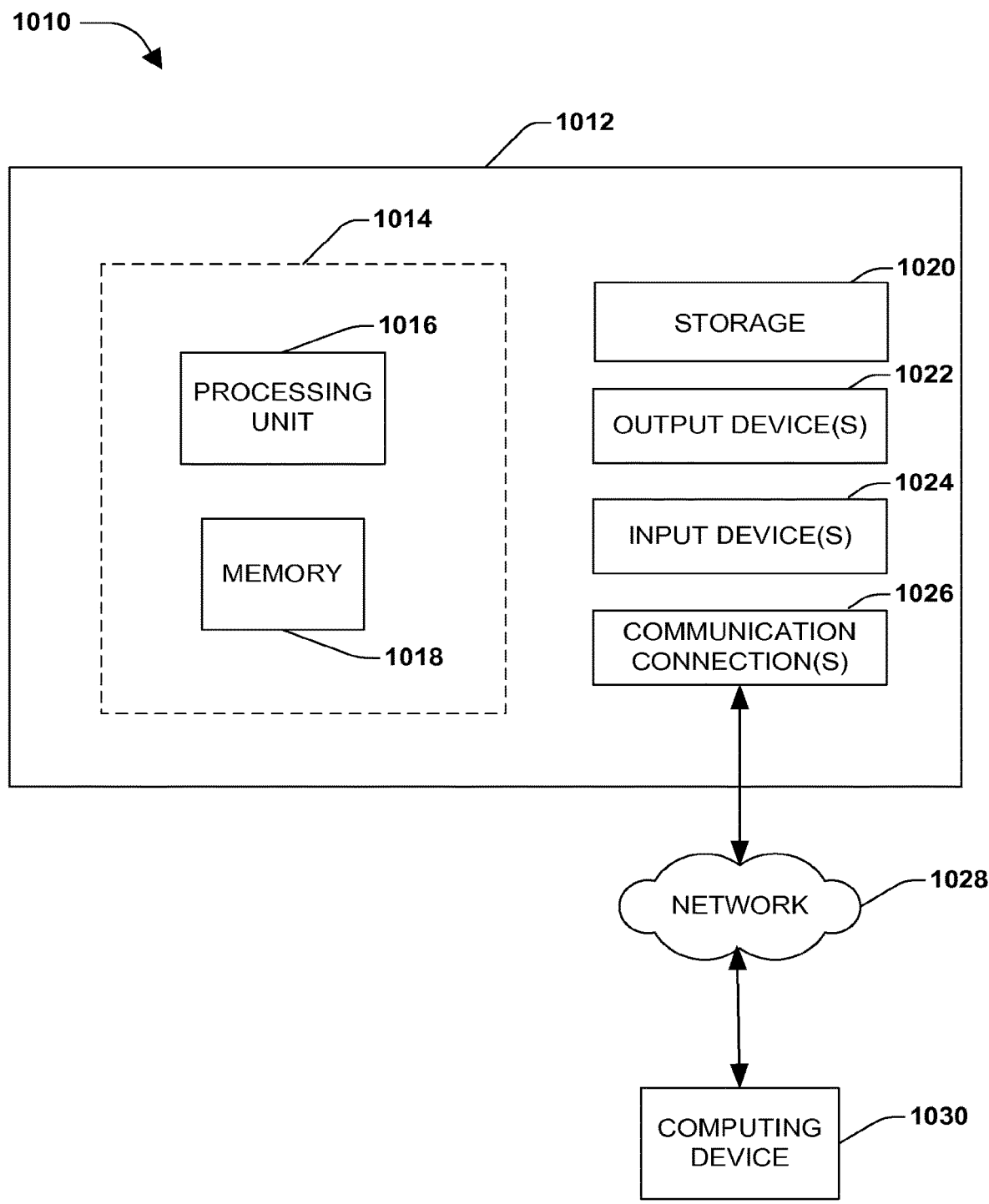
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed by a computing device, the method comprising:
    performing an image querying process to retrieve a plurality of positively-rated images that are related to a particular query, the plurality of positively-rated images having associated positive characterizations provided by users;

performing image processing on the plurality of positively-rated images to extract visual features from the plurality of positively-rated images;

defining an image cluster using the extracted visual features, the image cluster comprising particular positively-rated images retrieved in the image querying process that are associated with a particular topic related to the particular query;

performing a search result querying process to retrieve a plurality of search result web pages, separate from the plurality of positively-rated images retrieved via the image querying process, that are responsive to the particular query;

using the image cluster as a comparison model to perform a ranking process on the plurality of search result web pages, wherein the ranking process involves ranking the search result web pages relative to one another based at least on similarity of the search result web pages to the particular positively-rated images of the image cluster retrieved in the image querying process; and providing a response to the particular query based at least on the ranked search result web pages.

2. The method of claim 1, further comprising:
extracting textual features from the plurality of positively-rated images; and
using the textual features with the visual features to define the image cluster.

3. The method of claim 2, wherein the extracted visual features include a scale-invariant feature transform ("SIFT") feature of the plurality of positively-rated images.

4. The method of claim 2, further comprising:
executing a multimodal Dirichlet Process Mixture Sets model upon both the visual features and the textual features, the multimodal Dirichlet Process Mixture Sets model outputting the image cluster.

5. The method of claim 1, wherein the plurality of positively-rated images are retrieved from an image repository of user-generated images.

6. The method of claim 5, wherein the search result web pages are retrieved from a general-purpose search engine.

7. A system comprising:
a processing unit; and
a volatile or non-volatile memory storing instructions that, when executed by the processing unit, cause the processing unit to:
perform an image query to retrieve a plurality of positively-rated images that are related to a particular query for use in a comparison model, the plurality of positively-rated images having associated positive characterizations provided by users;
process the plurality of positively-rated images to extract features;
define a first image cluster of the comparison model using the extracted features, the first image cluster comprising first positively-rated images retrieved via the image query that are associated with a first topic related to the particular query;
define a second image cluster of the comparison model using the extracted features, the second image cluster comprising second positively-rated images retrieved via the image query that are associated with a second topic related to the particular query;
perform a search query to retrieve separate image search results, other than the plurality of positively-rated images retrieved for use in the comparison model, that are responsive to the particular query;
use the first image cluster and the second image cluster as the comparison model to rank the separate image search results; and
output the ranked separate image search results in response to the particular query.

8. The system of claim 7, wherein the instructions, when executed by the processing unit, cause the processing unit to:
organize the separate image search results using the first image cluster to identify first image search results that are associated with the first topic and using the second image cluster to identify second image search results that are associated with the second topic.

9. The system of claim 8, wherein the instructions, when executed by the processing unit, cause the processing unit to:
based at least on first features of the first positively-rated images, determine a first descriptive name of the first image cluster;
based at least on second features of the second positively-rated images, determine a second descriptive name of the second image cluster; and
provide a user interface that presents the first descriptive name together with a particular positively-rated first image from the first image cluster and the second descriptive name together with a particular positively-rated second image from the second image cluster.

10. The system of claim 9, wherein the instructions, when executed by the processing unit, cause the processing unit to:
responsive to first user input selecting the first image cluster, present the first image search results and not the second image search results on the user interface; and
responsive to second user input selecting the second image cluster, present the second image search results and not the first image search results on the user interface.

11. The system of claim 7, wherein the instructions, when executed by the processing unit, cause the processing unit to:
select the plurality of positively-rated images for the comparison model based at least on positive user comments characterizing the plurality of positively-rated images.

12. The system of claim 7, wherein the instructions, when executed by the processing unit, cause the processing unit to:
select the plurality of positively-rated images for the comparison model based at least on frequency of access by users to the plurality of positively-rated images relative to frequency of access by the users to other images that are also related to the particular query.

13. The system of claim 7, wherein the instructions, when executed by the processing unit, cause the processing unit to:
select the plurality of positively-rated images for the comparison model based at least on user voting data for the plurality of positively-rated images relative to user voting data for other images that are also related to the particular query.

14. The system of claim 7, wherein the instructions, when executed by the processing unit, cause the processing unit to:
define the first image cluster based at least on first visual features of the first positively-rated images and define the second image cluster based at least on second visual features of the second positively-rated images.

15. The system of claim 7, wherein the instructions, when executed by the processing unit, cause the processing unit to:

define the first image cluster based at least on first text features of the first positively-rated images and define the second image cluster based at least on second text features of the positively-rated second images.

16. A volatile or non-volatile memory or storage device storing instructions which, when executed by a processing unit, cause the processing unit to perform acts comprising:
    querying an image repository to retrieve a plurality of positively-rated images that are related to a particular query, the plurality of positively-rated images having associated positive characterizations provided by users;
    performing image processing on the plurality of positively-rated images to extract features from the plurality of positively-rated images;
    defining different image clusters using the extracted features, the different image clusters comprising respective positively-rated images retrieved from the image repository that are associated with respective topics related to the particular query;
    querying a search engine separate from the image repository to retrieve a plurality of search result web pages that are responsive to the particular query;
    using the different image clusters as a comparison model to rank the search result web pages retrieved from the search engine based at least on similarity to the respective positively-rated images of the different image clusters; and
    outputting the ranked search result web pages in response to the particular query.

17. The volatile or non-volatile memory or storage device of claim 16, the acts further comprising:
    presenting an interactive user interface having representations of the different image clusters; and
    responsive to user selection of a selected image cluster from the interactive user interface, presenting selected search result webpages associated with a selected topic of the selected image cluster on the interactive user interface.

18. The volatile or non-volatile memory or storage device of claim 17, the acts further comprising:
    presenting the respective topics on the interactive user interface together with the representations of the different image clusters and the selected search result webpages.

19. The volatile or non-volatile memory or storage device of claim 17, the acts further comprising:
    as user input is received selecting different respective image clusters associated with different topics, presenting different sets of search result webpages associated with the different topics on the interactive user interface.

* * * * *